United States Patent
Heath

(10) Patent No.: US 11,398,674 B2
(45) Date of Patent: Jul. 26, 2022

(54) ANTENNA MOUNT

(71) Applicant: CommScope Technologies LLC, Hickory, NC (US)

(72) Inventor: Dale Richard Heath, Fort Worth, TX (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 16/592,421

(22) Filed: Oct. 3, 2019

(65) Prior Publication Data

US 2020/0119442 A1   Apr. 16, 2020

Related U.S. Application Data

(60) Provisional application No. 62/743,750, filed on Oct. 10, 2018.

(51) Int. Cl.
| | | |
|---|---|---|
| *H01Q 3/02* | (2006.01) | |
| *H01Q 1/12* | (2006.01) | |
| *F16M 11/12* | (2006.01) | |
| *F16M 13/02* | (2006.01) | |
| *H01Q 1/00* | (2006.01) | |

(52) U.S. Cl.
CPC ............... *H01Q 3/02* (2013.01); *F16M 11/12* (2013.01); *F16M 11/126* (2013.01); *F16M 13/02* (2013.01); *H01Q 1/005* (2013.01); *H01Q 1/12* (2013.01); *H01Q 1/125* (2013.01); *H01Q 1/1228* (2013.01)

(58) Field of Classification Search
CPC ........ H01Q 3/02; H01Q 1/1228; H01Q 1/125; H01Q 1/12; H01Q 1/005; F16M 11/126; F16M 13/02; F16M 11/12
USPC ............................................................ 343/882
See application file for complete search history.

(56) References Cited

U.S. PATENT DOCUMENTS

| | | | | |
|---|---|---|---|---|
| 3,940,771 | A * | 2/1976 | Wild ....................... | H01Q 1/125 343/766 |
| 4,405,928 | A * | 9/1983 | Elsbernd .............. | H01Q 21/205 343/912 |
| 5,971,345 | A * | 10/1999 | Khalaf ................... | H01Q 1/125 248/512 |
| 7,659,865 | B2 * | 2/2010 | Kreitzberg ........... | H01Q 1/1235 343/880 |
| 9,812,762 | B2 | 11/2017 | Skrepcinski et al. | |
| 2008/0253889 | A1 * | 10/2008 | Krivcov .................. | F03D 3/005 416/44 |
| 2009/0223164 | A1 * | 9/2009 | Cook ....................... | H01Q 1/42 52/651.07 |
| 2011/0148116 | A1 * | 6/2011 | Halstead .................. | F03D 3/02 290/52 |
| 2018/0083337 | A1 * | 3/2018 | Roy ..................... | H01Q 1/1228 |
| 2019/0131703 | A1 | 5/2019 | Meyer et al. | |

* cited by examiner

*Primary Examiner* — Hai V Tran
(74) *Attorney, Agent, or Firm* — Myers Bigel, P.A.

(57) ABSTRACT

A mount for an antenna includes: a plurality of horizontal members; and a plurality of vertical members interconnected with the horizontal members, the vertical members configured and arranged for mounting of at least one antenna. At least one of the horizontal members and/or the vertical members has a cross-section that reduces drag under wind load.

14 Claims, 6 Drawing Sheets

ANTENNA MOUNT

RELATED APPLICATION

The present application claims priority from and the benefit of U.S. Provisional Patent Application No. 62/743,750, filed Oct. 10, 2018, the disclosure of which is hereby incorporated herein by reference in its entirety.

FIELD OF THE INVENTION

The present invention relates generally to mounts for antennas, and more particularly to mounts for antennas on an antenna tower or monopole.

BACKGROUND

With increased demand for more wireless communication, the number of radio and antenna units that a tower traditionally supports has increased and is expected to continue to increase. New towers will need to be designed to support greater numbers of antenna and radio units, while existing towers are retrofitted to support more units, and effort is made to fully utilize space available on the towers.

In addition, antennas are becoming larger in order to handle more wireless traffic. One parameter that influences antenna design is Effective Projected Area (EPA), which is determined by calculations defined by TIA/ANSI-222-G. EPA is intended to predict the effect of wind loading on an antenna structure to enable designers to create a safe design. The configuration of the antenna mount can impact the calculations. As such, minimizing an antenna mount's contribution to EPA can be desirable.

One approach that addresses EPA, weight, strength and assembly requirements of antenna mounts is discussed in U.S. Pat. No. 9,812,762 to Skrepeinski et al., the disclosure of which is hereby incorporated herein by reference. The mount includes two generally C-shaped arms, each with upper and lower free ends; equipment face mounting brackets mounted on the arms; and lower and upper plates mounted to a post. The upper free ends of the arms are pivotally mounted to the upper plate, and the lower free ends of the arms are pivotally mounted to the lower plate, such that the arms are movable between retracted and extended positions. The arms are fixed in the extended position relative to the upper plate via fasteners inserted through holes in the upper free ends of the arms and in the upper plate, and the arms are fixed in the extended position relative to the lower plate via fasteners inserted through holes in the lower free ends of the arms and in the lower plate. The pivotal mounts and the holes defining a desired angle between the first and second arms in the extended position.

It may be desirable to provide additional mounts that address EPA, weight and strength requirements.

SUMMARY

As a first aspect, embodiments of the invention are directed to a mount for an antenna comprising: a plurality of horizontal members; and a plurality of vertical members interconnected with the horizontal members, the vertical members configured and arranged for mounting of at least one antenna. At least one of the horizontal members and/or the vertical members has a cross-section that reduces drag under wind load.

As a second aspect, embodiments of the invention are directed to a mount for an antenna comprising: a plurality of horizontal members; and a plurality of vertical members interconnected with the horizontal members, the vertical members configured and arranged for mounting of at least one antenna. At least one of the horizontal members is configured to provide lift under wind load.

As a third aspect, embodiments of the invention are directed to a mount for an antenna comprising: a plurality of horizontal members; and a plurality of vertical members interconnected with the horizontal members, the vertical members configured and arranged for mounting of at least one antenna. At least one of the horizontal members is movable relative to the vertical members, such movement varying drag and/or life due to wind load.

As a fourth aspect, embodiments of the invention are directed to an assembly comprising an antenna and an antenna mount. The antenna mount comprises: a plurality of horizontal members; and a plurality of vertical members interconnected with the horizontal members, the antenna mounted on the vertical members. A cable connected to the antenna is routed inside at least one of the horizontal members and/or at least one of the vertical members

DETAILED DESCRIPTION

Figure 1:
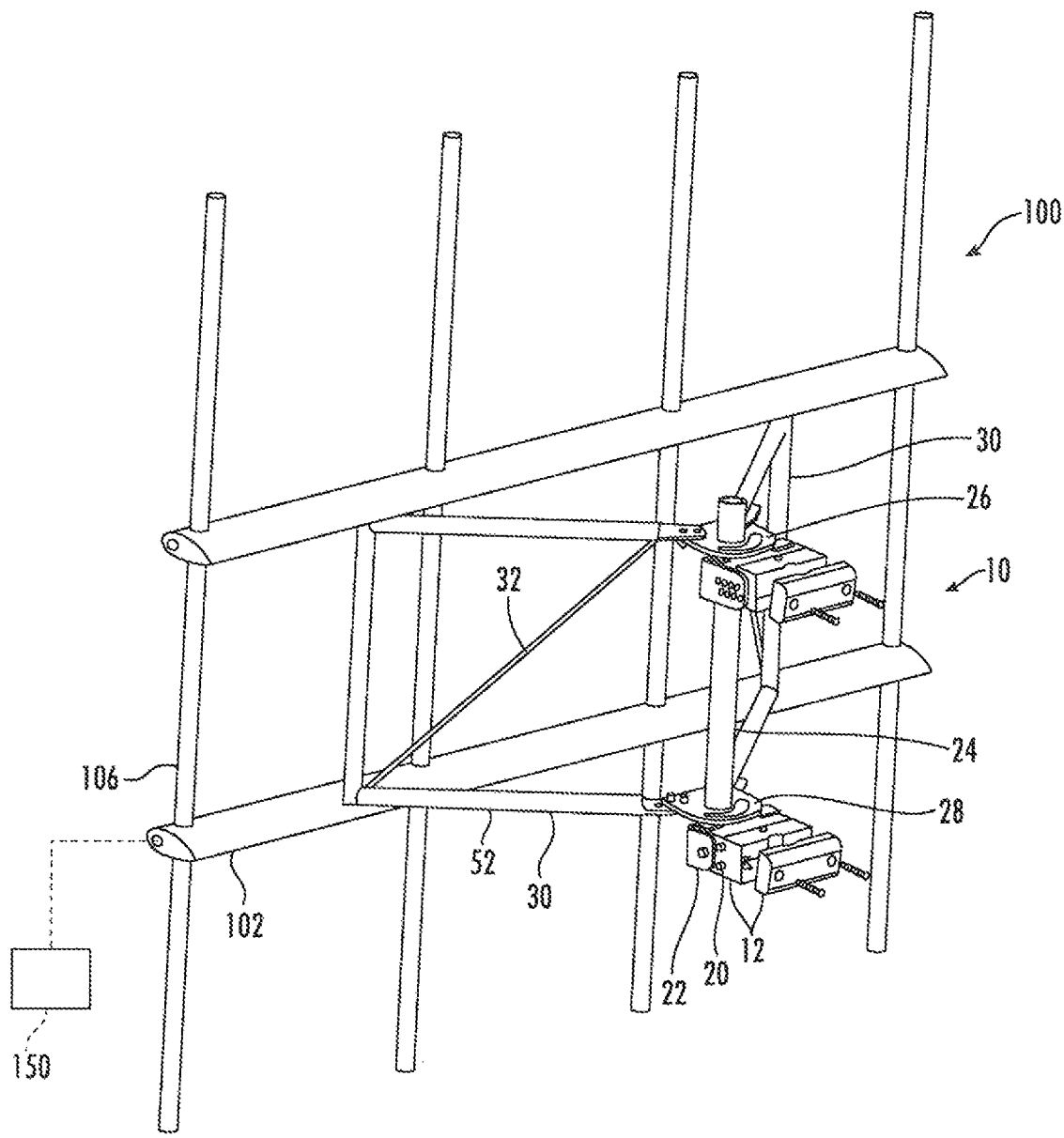
FIG. 1 is a perspective view of an antenna mount and antenna according to embodiments of the invention.
Figure 2:
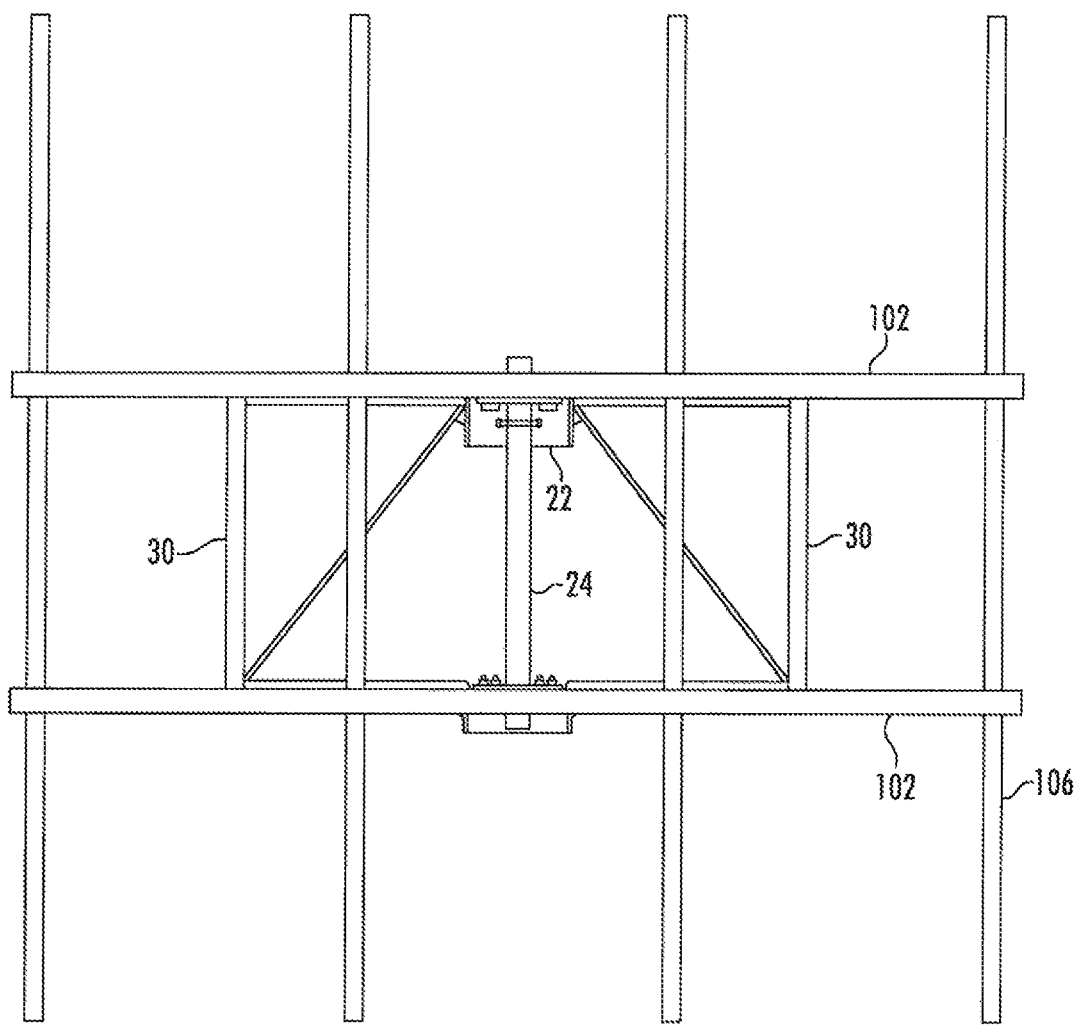
FIG. 2 is a front view of the antenna mount of FIG. 1.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Referring now to the drawings, an antenna mount, designated broadly at 10, is illustrated in FIGS. 1-4. Generally, the mount 10 includes two pipe clamps 12 that are configured to attached to a leg of an antenna tower (not shown), side panels 20 that are attached to the pipe clamps 12 and to U-bolt brackets 22, a vertical post 24 attached to the U-bolt brackets 22, upper and lower azimuth adjustment plates 26, 28 that are mounted on the post 24, and two generally C-shaped arms 30 that are pivotally attached to the upper and lower azimuth adjustment plates 26, 28. Diagonal braces 32 may also provide stability. Details regarding the structure, function and deployment of these components are provided in U.S. patent application Ser. No. 15/139,057, supra, and need not be described in detail herein.

A frame 100 for antenna and/or radio mounting is shown mounted to the arms 30. The frame 100 includes two horizontal members 102 that are mounted to the arms 30 via U-bolts or other fasteners. Notably, the horizontal members 102 are positioned at essentially the same elevation as horizontal runs 52 of the arms 30, which can reduce EPA. Vertical members 106 (in the illustrated embodiment four vertical members 106 are present) are mounted to the horizontal members 102 via U-bolts or the like. The vertical members 106 provide mounting locations for an antenna (one of which is shown schematically at 110 in FIG. 3).

Figure 3:
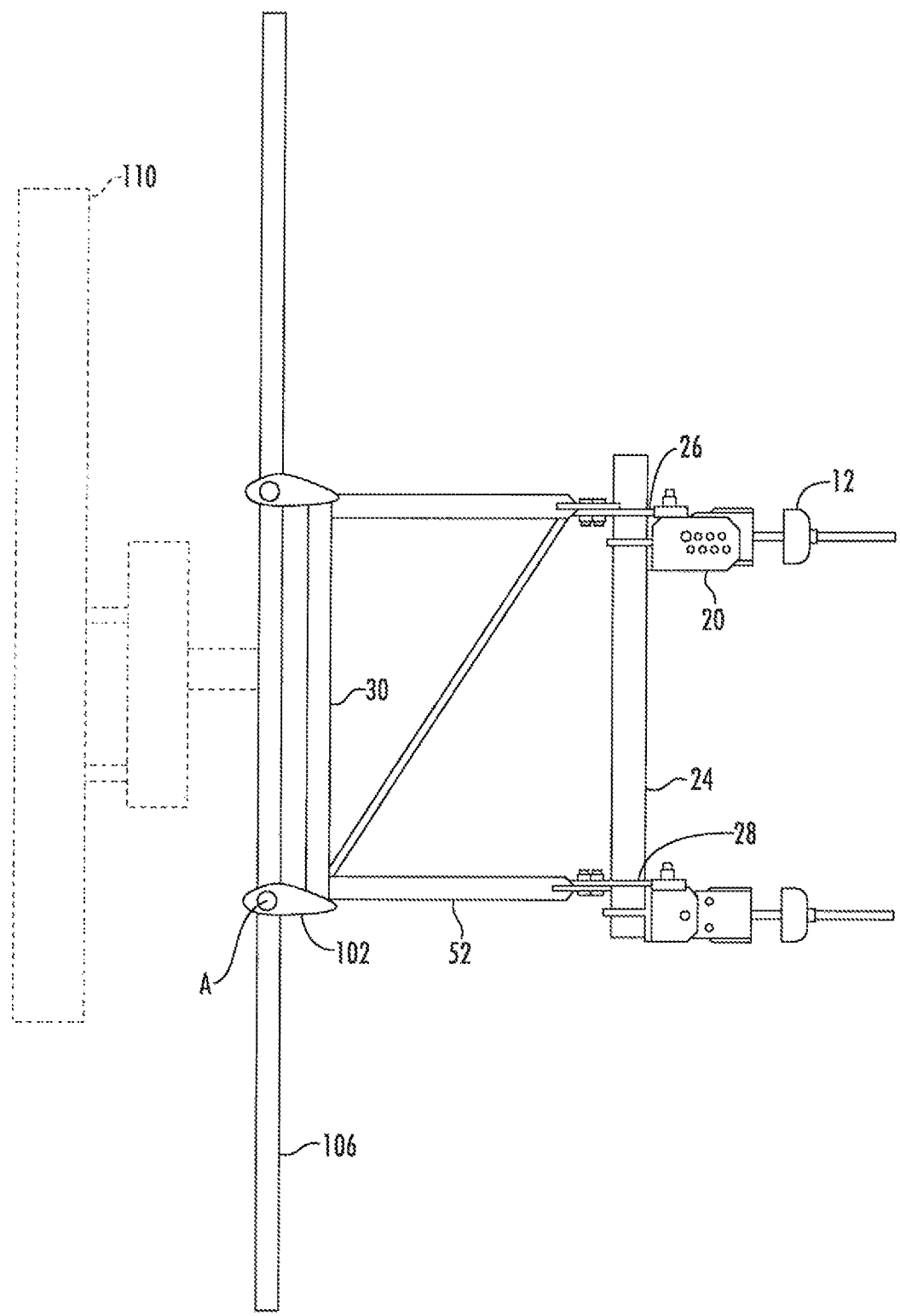
FIG. 3 is a side view of the antenna mount of FIG. 1.
Figure 4:
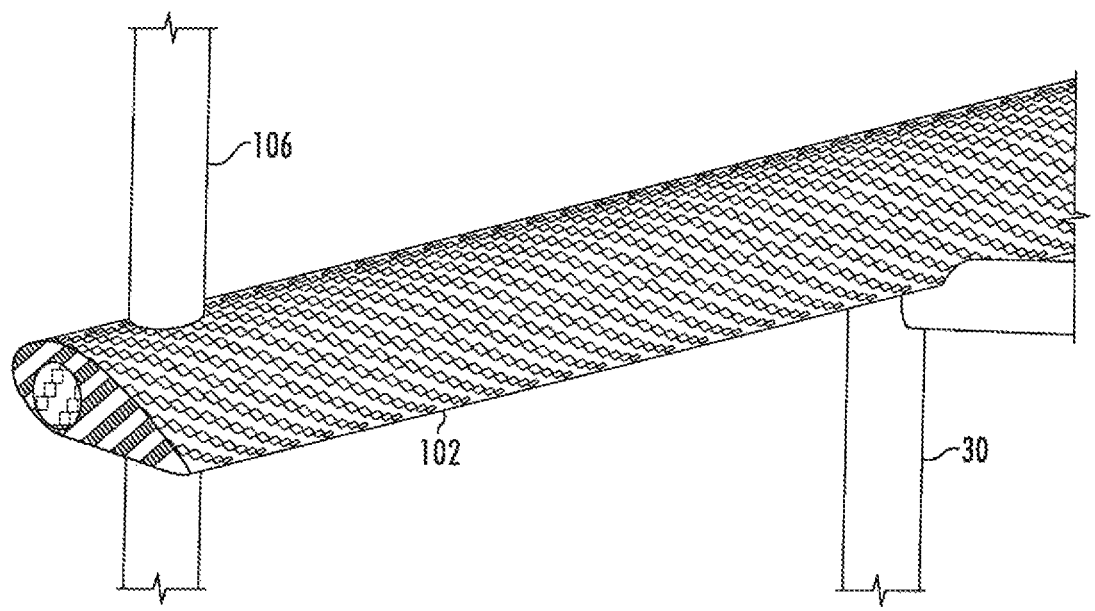
FIG. 4 is an enlarged perspective view of a portion of a horizontal member of the frame of the antenna mount of FIG. 1.
Figure 5A:
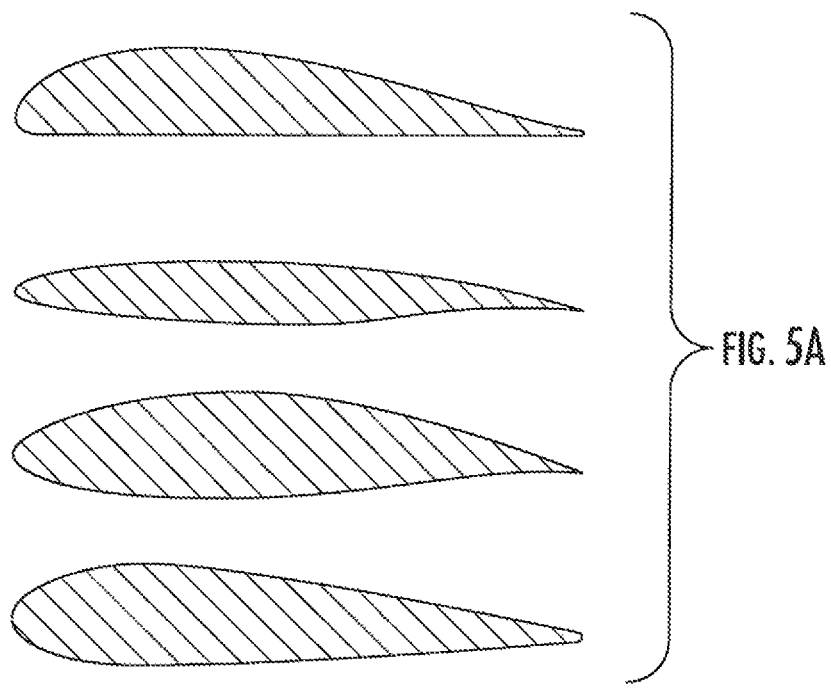
FIG. 5A depicts cross-sections of exemplary airfoil shapes that may be employed in horizontal or vertical members of the frame of the antenna mount of the present invention.
Figure 5B:
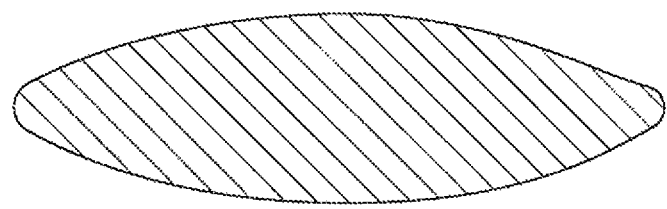
FIG. 5B depicts a cross-section of an exemplary fusiform shape that may be employed in horizontal or vertical members of the frame of the antenna mount of the present invention.
Figure 5C:
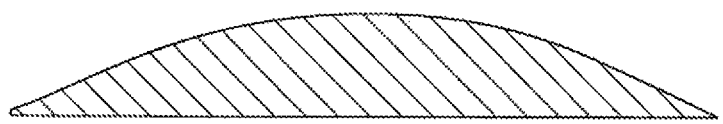
FIG. 5C depicts a cross-section of an exemplary convex shape that may be employed in horizontal or vertical members of the frame of the antenna mount of the present invention.
Figure 5D:
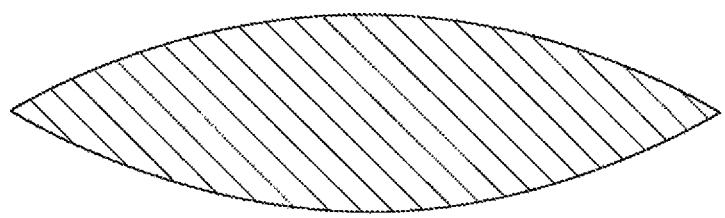
FIG. 5D depicts a cross-section of an exemplary bi-convex shape that may be employed in horizontal or vertical members of the frame of the antenna mount of the present invention.

As can be seen in FIGS. 3 and 4, the horizontal members 102 are not round in cross-section as is the case with the mount shown in U.S. patent application Ser. No. 15/139,057, supra, but instead have an airfoil, fusiform, convex, biconvex or similar cross-section with the intent of reducing drag and/or creating lift. As used herein, an "airfoil" shape has with a rounded leading edge, followed by a sharp trailing edge, often with a symmetric curvature of upper and lower surfaces. A "fusiform" shape (which is common to many aquatic animals) is characterized by being tapered at both the head and the tail. A "convex" shape protrudes in at least one direction normal to its longitudinal axis, and a "biconvex" shape protrudes in both directions normal to its longitudinal axis. Cross-sections of exemplary airfoil, fusiform, convex and bi-convex designs are shown in FIGS. 5A-5D, respectively.

As discussed above, antenna mounts are rated based on their calculated EPA as set forth in ANSI/TIA-222-G Structural Standard for Antenna Supporting Structures and Antennas, *Table* 2-8. *Force Coefficients (Ca) For Appurtenances and Table* C1: *Wind Force Coefficients for Typical Microwave Antenna without Radome.* An airfoil, fusiform, convex or biconvex shape on the horizontal members 102 can reduce the drag created by wind that reaches the frame 100. As such, the load on the tower created by wind can be reduced.

Although not illustrated in FIGS. 1-4, it can be understood that the vertical members 106 may also be formed with an airfoil, fusiform, convex, bi-convex or other drag-reducing cross-section. Vertical members 106 that are so configured can also reduce calculated EPA and, as such, the load experienced by the tower under wind loading.

Reducing the wind load experienced by the tower due to the mount 10 and accompanying antenna(s) can improve performance in multiple ways. First, a reduced wind load may reduce the chance structural failure of the tower, mount or antenna, particularly at the joints. Second, a lower wind load caused by the shape of a mount may enable more material to be used in the mount, thereby making it stronger. Third, a reduced wind load may cause less sway of the tower, mount and antenna, which can improve performance of the antenna. Those of skill in this art will appreciate that there may be other performance aspects that can improve with reduced wind load.

Figure 6:
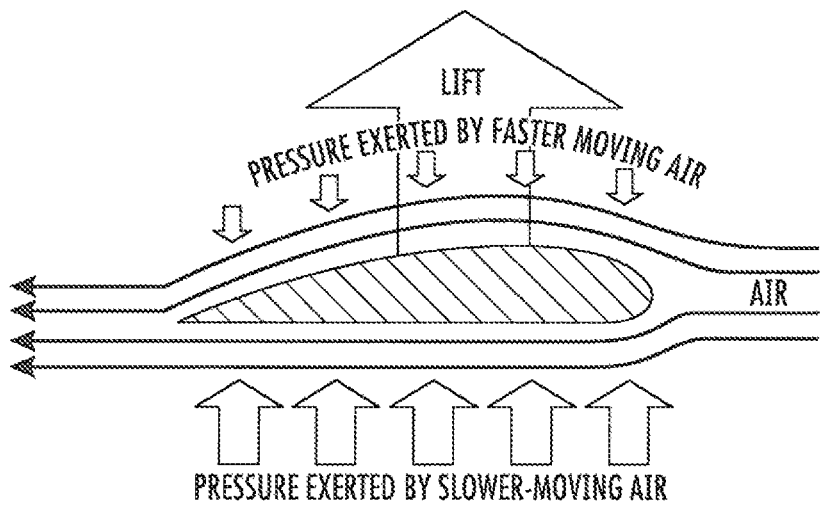
FIG. 6 is a cross-section of a horizontal member of the antenna mount of FIG. 1 showing how wind can create lift.

It should also be understood that horizontal members 102 having an airfoil shape may also create lift under wind loading. This can be understood by comparison of an airfoil-shaped horizontal member 102 to an airplane wing. As an airplane wing is conveyed through the air, its shape and/or orientation can create lift (which, of course, maintains the airplane in flight). Similarly, a horizontal member 102 having an airfoil-shaped cross-section can experience lift under wind loading, which in turn can decrease the load created by the mount 100 and attached antenna under wind (see FIG. 6).

In some embodiments, the frame 100 may include mechanisms to enable one or more horizontal members 102 to rotate about their longitudinal axes (i.e., to rotate about a horizontal axis that is parallel with the horizontal members 102—shown at A in FIG. 3). Such rotation can vary the orientation (or pitch) of the horizontal members 102 relative to the ground (and, in turn, relative to the wind direction). By rotating the pitch of the horizontal members 102, the magnitude of lift due to the wind can be advantageously varied to decrease the load on the tower. Such mechanisms may be configured so that the vertical members 106 to which the antenna is mounted do not substantially move, in order to maintain the elevation, tilt and azimuth settings of the antenna.

Figure 7:
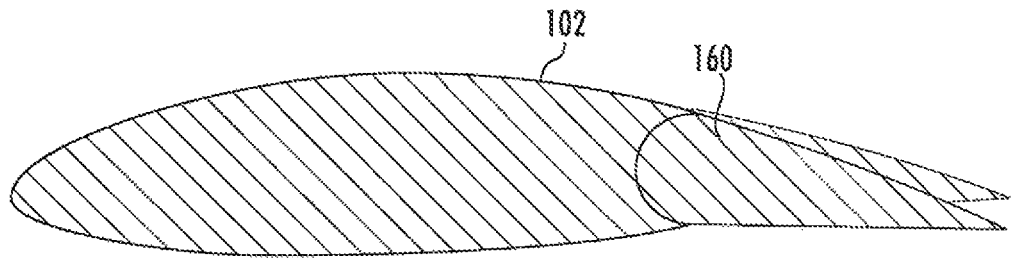
FIG. 7 is a cross-section of a horizontal member of the antenna mount of FIG. 1 with an aileron attached to create lift according to alternative embodiments of the invention.

In other embodiments, the horizontal members 102 may include elevators, ailerons or other movable members that can affect the magnitude of wind loading. Elevators and ailerons (an aileron is shown at 160 in FIG. 7) may extend for a portion or for the full length of the horizontal members 102, and in some embodiments a single horizontal member 102 may have multiple ailerons/elevators (for example, a horizontal member 102 may have an ailerons/elevator between each intersection with a vertical member 106). The elevators/ailerons may be deployed to modify the wind load experienced by the frame 100.

In instances in which either the horizontal members 102 can vary in pitch or in which elevators and ailerons are included on the horizontal members 102, movement of these components may be activated and monitored by a controller 150 (FIG. 1) The controller 150 may be configured to accept manual input regarding the orientation of the horizontal members 102 and any ailerons/elevators, or may be configured to receive environmental data (e.g., data on wind speed and/or direction) and signal the components to move in response to such data. The inclusion of a controller (and in particular a "smart" controller that bases movements of the components on environmental data) can reduce the wind load on the tower by moving the horizontal members 102 and/or ailerons/elevators to advantageous positions.

It will be understood by those of skill in this art that a typical antenna arrangement will have multiple "sectors" (often with three antennas) arranged around the antenna tower. Thus, different antenna mounts around the antenna tower will experience different wind loads because they are oriented in different directions. The controller 150 may be configured to control the movements of the horizontal members 102 and/or ailerons/elevators of more than one antenna mount 10, and to consider the effects of such movements on all of the mounts 10 as a whole in order to coordinate the movements to reduce or minimize the overall loading of the tower.

In addition, the controller 150 may consider the condition of other antennas mounted to other towers in adjusting the mount 10. Techniques for adjusting the movement of a mount (particularly the downtilt) are discussed in U.S. Patent Publication No. 2019/0131703 to Meyer et al., the disclosure of which is hereby incorporated herein in its entirety.

Referring now to FIG. 4, an enlarged portion of a horizontal member 102 is shown therein. It can be seen that, in some embodiments, one or more surfaces of the horizontal member 102 may be textured or contoured in a manner that provides lift. As an example, the upper and lower surfaces of the horizontal member 102 may be dimpled, stippled, roughened, or the like. In this sense the surface of the horizontal member 102 may be compared to a golf ball, which typically has dimples in a predetermined pattern. The dimples create an advantageous air flow pattern (due to the creation of a thin turbulent boundary layer) that creates lift for the ball. The inclusion of texture or contour in one or more surfaces of the horizontal member 102 may increase lift, which in turn can reduce load on the antenna tower due to wind. For example, a horizontal member 102 may have dimpled lower and front surfaces to create lift.

Figure 8:
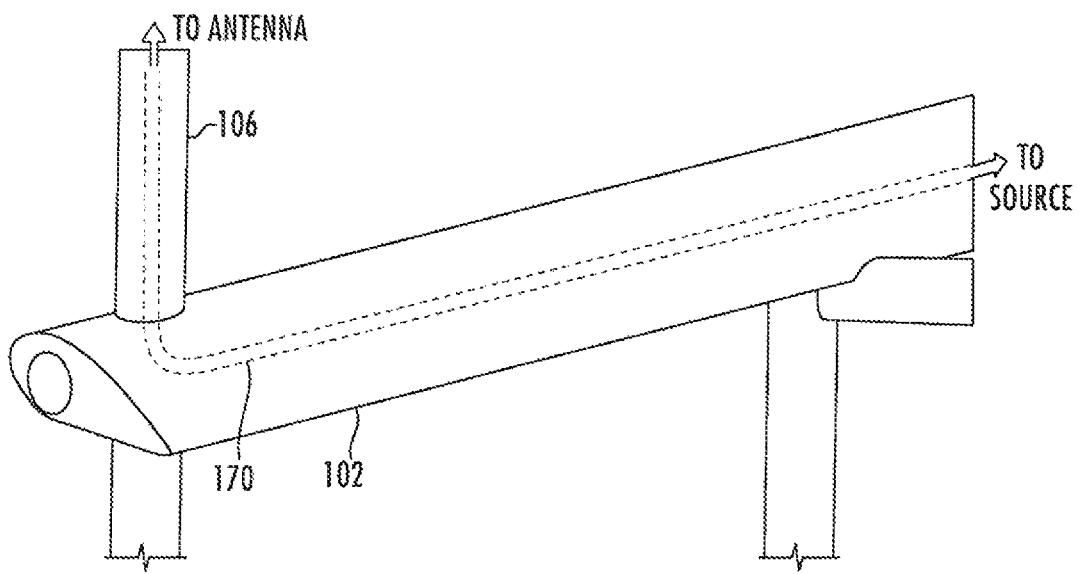
FIG. 8 is a perspective view of a horizontal member of the antenna mount of FIG. 1 with a cable routed within, according to alternative embodiments of the invention.

It is also notable that the horizontal members 102 and/or the vertical members 106 may be at least partially hollow, which can enable the routing of cables therein (see FIG. 8, wherein cable 170 is positioned within the horizontal member 102). Locating cables within one of these components can reduce the impact that loose cables may have on wind loading. In addition, locating the cables within the horizontal and/or vertical members 102, 106 can improve network performance, particularly passive intermodulation (PIM) performance, as connections can be stabilized (for example, connectors may be mounted directly within a horizontal member 102, which can lead to more consistent connections) and can be protected from the environment. PIM may also be reduced via welded connections between components.

The mount 10 may be formed of any material that is sufficiently strong and rigid to support antennas. Steel or another metallic material may be employed. Alternatively, mounts can be made of fiber-reinforced elastomer carbon fiber, fiberglass and polymeric materials (filled or unfilled). Any convex cross section, i.e. round, elliptical, round and square members can be made by filament winding, pultrusion or compression molding. Pultrusion shapes can also include interlocking features for the tower-mounted devices which can be used an attachment feature. Polymeric materials tend to be lighter than metals, thereby reducing the overall weight of the mount, and are typically dielectric materials that do not significantly impact network performance.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:
1. An antenna mount, comprising:
a plurality of horizontal members; and
a plurality of vertical members interconnected with the horizontal members to define a generally planar frame, the vertical members configured and arranged to support at least one antenna;
wherein at least one of the vertical members has an airfoil or fusiform cross-section that reduces drag under wind load.

2. The mount defined in claim 1, wherein at least one of the plurality of horizontal members has a cross-section that reduces drag under wind load.

3. The mount defined in claim 2, wherein the at least one horizontal member has an airfoil or a fusiform cross-section.

4. The mount defined in claim 2, wherein the at least one horizontal member has a surface textured to provide lift under wind load.

5. The mount defined in claim 4, wherein the textured surface of the at least one horizontal member comprises dimples.

6. The mount defined in claim 4, wherein the textured surface of the at least one horizontal member is an upper surface of the horizontal member.

7. An antenna mount, comprising:
 a plurality of horizontal members; and
 a plurality of vertical members interconnected with the horizontal members, the vertical members configured and arranged to support at least one antenna;
 wherein at least one of the horizontal members is configured to provide lift under wind load, the at least one horizontal member having a cross-sectional shape selected from the group consisting of: an airfoil, fusiform, and biconvex, and
 wherein the at least one horizontal member is configured to rotate about its longitudinal axis.

8. The mount defined in claim 7, wherein the at least one horizontal member has a surface textured to provide lift under wind load.

9. The mount defined in claim 8, wherein the textured surface comprises dimples.

10. The mount defined in claim 7, wherein the at least one horizontal member includes an elevator or aileron that can be moved to a position in which it increases lift on the horizontal member under wind load.

11. An antenna mount, comprising:
 a plurality of horizontal members;
 a plurality of vertical members interconnected with the horizontal members, the vertical members configured and arranged to support at least one antenna;
 wherein at least one of the horizontal members is movable relative to the vertical members, such movement varying drag and/or lift due to wind load; and
 a controller configured to move the at least one horizontal member responsive to environmental conditions.

12. The mount defined in claim 11, wherein the at least one horizontal member has a cross-sectional shape that provides lift under wind load.

13. The mount defined in claim 11, wherein the at least one horizontal member has a surface textured to provide lift under wind load.

14. The mount defined in claim 11, wherein the controller is configured to move the at least one horizontal member responsive to wind speed and/or direction.

* * * * *